United States Patent [19]

Früngel

[11] 4,288,158
[45] Sep. 8, 1981

[54] LASER CEILOMETER WITH SAFETY POWER-REDUCTION FEATURE

[76] Inventor: Frank Früngel, Herwigredder 105a, 2000 Hamburg 56, Fed. Rep. of Germany

[21] Appl. No.: 24,779
[22] Filed: Mar. 28, 1979

[30] Foreign Application Priority Data

Mar. 31, 1978 [CH] Switzerland .................. 3468/78

[51] Int. Cl.³ .................. G01C 3/08; G08B 21/00
[52] U.S. Cl. .................. 356/4; 340/689; 356/5; 362/802
[58] Field of Search .................. 356/4, 5; 219/121; 89/134, 41 C; 362/802; 42/70 G; 343/760; 340/689

[56] References Cited

U.S. PATENT DOCUMENTS

| | | | |
|---|---|---|---|
| 1,341,267 | 5/1920 | East | 362/802 |
| 3,222,511 | 12/1965 | Breeding | 362/802 |
| 3,400,393 | 9/1968 | Ash | 89/134 |
| 3,739,364 | 6/1973 | Talkington et al. | 343/760 |
| 3,963,347 | 6/1976 | Segre et al. | 356/5 |

*Primary Examiner*—Stephen C. Buczinski
*Attorney, Agent, or Firm*—Michael J. Striker

[57] ABSTRACT

A laser ceilometer emits a pulsed and narrow beam of visible or invisible laser radiation directly vertically upwards. The effective power level of the emitted radiation is lower, but only by a safety margin, than can result in eye damage to naked-eye observers viewing the directly emitted beam directly, but is higher than the power level resulting in eye damage to an observer viewing the directly emitted beam directly through a telescope having an objective of 80 mm diameter. When, in the course of cleaning or adjustment work, or for any reason, the ceilometer is tilted from its normal, vertically upwards aimed orientation towards a horizontally aimed orientation, by an angle of more than 10° with respect to the upwards vertical, the effective emitted laser power is reduced to a level additionally preventing eye damage to such telescope users, by automatic reduction of the pulse amplitude, and/or the pulse duration, and/or the pulse repetition frequency, but without terminating the emission of laser radiation. Alternatively, the emission of laser radiation ceases altogether until the ceilometer reassumes its vertically upwards aimed orientation. This latter alternative may be accomplished by interposing a neutral density glass filter into the laser beam.

14 Claims, 1 Drawing Figure

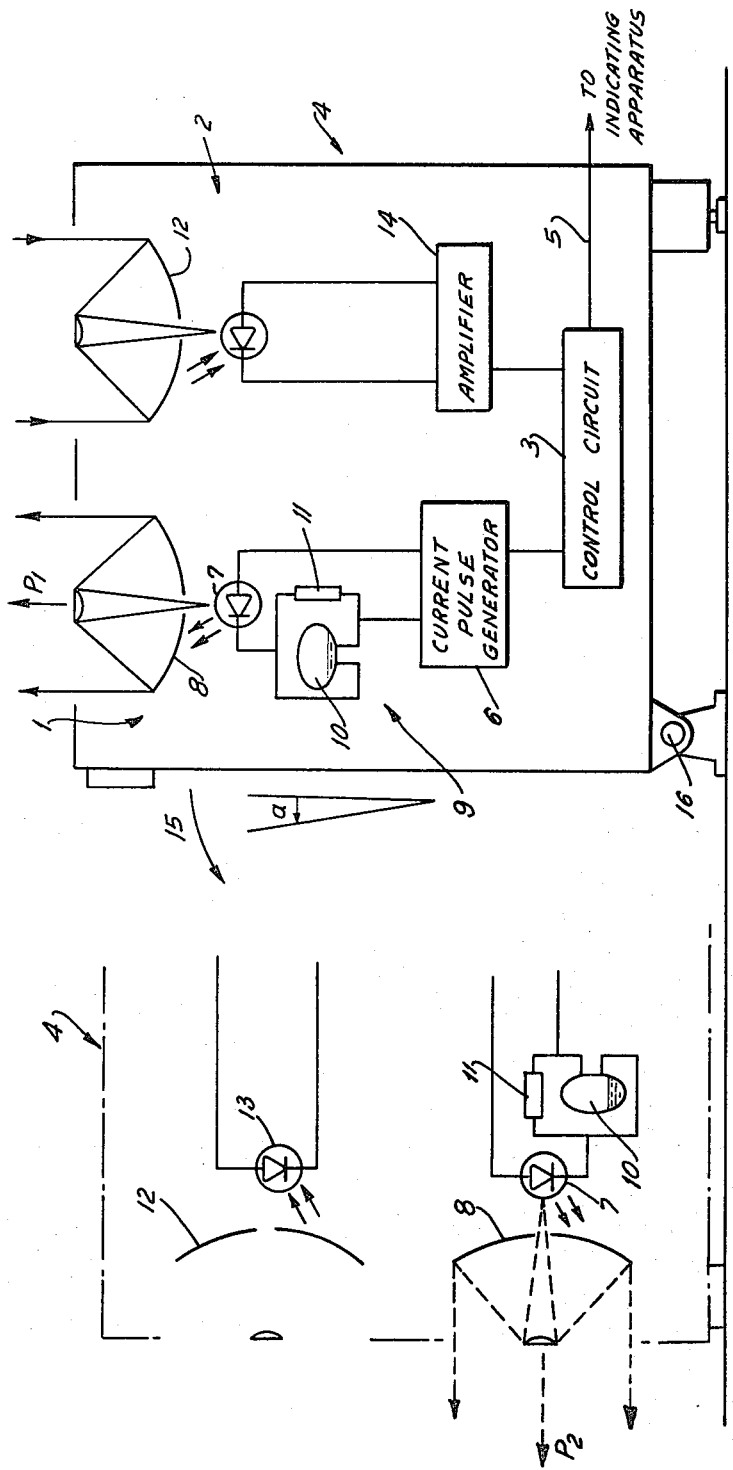

LASER CEILOMETER WITH SAFETY POWER-REDUCTION FEATURE

BACKGROUND OF THE INVENTION

The use of ceilometers which employ a laser instead of more conventional light sources such as pulsed arc-discharge lamps inherently can make possible a very substantial increase in the distance range within which such ceilometers can operate, due to the higher transmittable powers and lower beam divergence which are characteristic of lasers. However, very serious limitations are placed upon the transmitted-power increases potentially available, due to considerations involving the possibility of damage to the eyes of human observers. Internationally accepted safety standards intended to prevent the possibility of eye damage to human observers, require, as a matter of governmental regulation, that the transmitted radiant power be limited to what are indeed relatively low levels, compared to those potentially available. These governmental regulations take into account not merely the possibility of eye damage resulting to an observer who looks into the emitted beam with his naked eye, but additionally take into account the possibility for eye damage when the beam is inadvertently looked into by a human observer using various optical instruments, e.g., a pair of binoculars, a telescope, and so forth. For example, in the U.S., the ANSI standards (in Class 3) require that no eye damage result when an emitted pulse of laser energy is viewed through a telescope whose objective has a diameter of 80 mm.

The expression "viewing emitted laser energy" will be understood to refer to the case where a human observer looks towards the laser radiation source or the transmitting optics of the ceilometer in the direction exactly opposite to that in which the laser radiation is being emitted from the ceilometer. Likewise, it will be understood that laser radiation of the types which can be employed for ceilometric applications can be of wavelengths falling outside the range of visible wavelengths.

SUMMARY OF THE INVENTION

It is a general object of the invention to provide a laser ceilometer of such a character that it makes possible the use of transmittable powers considerably higher than what has heretofore been possible for compliance with applicable eye-safety standards, in order to increase the operative distance range of the ceilometer, but without actually increasing the possibility of eye damage.

In accordance with the present invention, this is achieved by providing an automatic switching device which is inherently activated whenever the ceilometer is, for whatever reason, tilted from a position in which the emitted laser beam is emitted directly upwards to a position in which the emitted beam makes with the vertically upwards direction an angle in excess of a predetermined value. When activated, the automatic safety switching device modifies the operation of the ceilometer in a sense preventing the possibility of eye damage to observers who are observing the laser with naked eyes or through an optical instrument. In the simplest case the laser beam power reduction can be effected by mechanical or electromagnetic movement of a gray neutral density optical absorbing glas into the emitted laser beam.

Eye damage can result from a single emitted pulse of laser radiation, if the single emitted pulse is of sufficiently high power. Likewise, even if the transmitted power level is such that viewing of a single emitted pulse cannot per se cause definable eye damage, a series of pulses may cause eye damage when their pulse repetition frequency is great enough that the cumulative or totalized power of a succession of viewed pulses becomes a factor posing a threat. Thus, according to one concept of the present invention, when the laser ceilometer is displaced such that its emitted beam makes more than a predetermined angle with the upwards vertical, the effective (i.e., potentially eye damaging) power of the emitted radiation is lowered by automatic reduction in the per-pulse emitted power, and/or by automatic reduction of the emitted pulse-repetition frequency, and/or by automatic reduction of the duration of each emitted pulse, and/or by automatic reduction in the amplitude or maximum instantaneous power achieved during each single emitted pulse.

An insight underlying the concept of the present invention is that the emitted laser pulses will not be viewed by human observers using a telescope or binoculars, when the ceilometer is in its operative orientation, i.e., with the emitted beam being emitted directly vertically upwards. The emitted laser beam could be viewed from directly above, at the most, by the occupant of an overhead aircraft. Inasmuch as the divergence of an emitted laser beam such as here contemplated is exceedingly narrow, e.g., typically less than 1/10 of a degree, the probability of the occupant of an overhead aircraft being able to peer directly into the beam is very small, even for example if the aircraft involved is a hovering helicopter, and the probability of such an occupant being able to peer directly into so narrow a beam for any substantial length of time is even smaller, particularly for example if the aircraft is in horizontal flight. Most importantly, when the possibility of the occupant of an overhead aircraft viewing the beam directly through a telescope or binoculars is considered, it is to be noted that even to get the direct beam directly into the field of view of such instrument, i.e., deliberately, represents an almost immeasurably small possibility, and much less still the possibility of retaining the direct beam in the direct field of view for more than an instant.

Accordingly, an insight underlying the inventive concept is that the only real danger of eye damage to an observer viewing the direct emitted beam through a telescope is for observers on land, or possibly on board a ship, when the laser ceilometer is tilted from its vertically upwards operative position to an inoperative position, e.g., due to the ignorance of unskilled personnel or in the course of maintenance or routine inspection and calibration work. Indeed, ceilometers are often tilted from operative position to a position in which their beam is emitted horizontally outwards, in the course of adjusting or testing the operation of the laser or the ceilometer's transmitting optics, and also rather frequently for routine cleaning. When tilted over into horizontal position, the emitted laser beam can indeed be rather too easily observed, i.e., on a direct line-of-sight basis, by persons who happen to be using telescopes or binoculars within the operative range of the laser beam. The present invention, by automatically lowering the effective power of the emitted laser radiation (i.e., the power considered in terms of eye-damage potential), or indeed by automatically shutting off the beam-emitting action of the ceilometer altogether, avoids the rather serious potential for eye damage associated with the horizontally tilted-over position of the ceilometer. As a result, it becomes safe and feasible to employ very substantially greater transmitted radiant power, for the case where the ceilometer is in vertically upwards aimed position, i.e., effective power levels which are just below (including of course a safety margin) the levels of effective power conventionally defined as posing a threat of eye damage to occupants of overhead aircraft observing the direct beam directly with the naked eye; accordingly, the effective emitted power can be established at a level far higher than what has conventionally been considered the maximum permissible value associated with the threat of eye damage to observers viewing the beam directly through a telescope having, e.g., an objective of 80 mm diameter. This makes feasible a very substantial increase in the distance range within which the ceilometer is operative.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

The single FIGURE schematically depicts one exemplary embodiment of the invention.

DESCRIPTION OF THE PREFERRED EMBODIMENTS

In the FIGURE, by way of example, it is assumed that the laser ceilometer has for its laser-energy emitting element a laser-diode array. The ceilometer is shown at the right in solid lines in its normal, operative position, and is shown at the left tilted over into its horizontally aimed position, such as it would assume during certain types of inspection and cleaning work or due to ignorance of personnel performing such work, or any other reason.

The ceilometer comprises a transmitter 1, a receiver 2 and a control circuit 3, all accommodated within a single housing 4, and also a (non-illustrated) indicator apparatus connected to the internal circuitry of the ceilometer by means of a cable 5. The transmitter 1 comprises a current-pulse generator 6 controlled by control circuit 3 and operative for effecting pulsed energization of a GaAs-GaAlAs laser-diode array 7. The transmitter 1 furthermore includes a transmitting optics 8 of cassegrainian-telescope configuration. Connected in series with the laser-diode array 7 is a switching stage 9 comprised of a mercury switch 10 and connected parallel thereto a resistor 11. The mercury switch 10 is so disposed and mounted within the instrument housing 4 that it assumes its closed state (i.e., the mercury of the switch conductively connecting the two electrodes of the switch), when the pulsed beam emitted by the diode array 7 through the transmitting optics 8 is aimed directly vertically upwards. The configuration of the container accommodating the switch's mercury, the amount of mercury contained, and the locations of the switch's electrodes are so chosen that the mercury switch 10 opens when the ceilometer is tilted from its vertically aimed directly by more than 20°, preferably when tilted by more than only 10°. The amplitude, pulse duration and pulse-repetition frequency of the current pulses furnished by current-pulse generator 6 are so selected, i.e., for operation with mercury switch 10 closed, that the emitted effective power $P_1$ of the ceilometer is lower only by a safety margin than the level of effective radiant power associated with naked-eye-observer eye damage, and therefore very substantially higher than the level of effective radiant power associated with eye damage for observers viewing the direct beam directly through an 80-mm-diameter-objective telescope. When the ceilometer is tilted over towards a horizontally aimed position, the mercury switch 10 opens, thereby effectively connecting resistor 11 into circuit with current-pulse generator 6, as a result of which the effective emitted power of the ceilometer's pulsed beam is lowered to a value $P_2$ lower than the effective-radiant-power level associated with eye damage to observers using field glasses. This can be accomplished by utilizing the resistor 11 to merely load the current furnished by current generator 6, to thereby decrease the amplitude of the emitted laser pulses, and/or by changing a time-constant of the frequency-determining circuitry of the current-pulse generator 6 so as to lower the pulse-repetition frequency employed, and/or by changing a time-constant of the frequency-determining circuitry of current-pulse generator 6 to decrease the pulse duration of each current pulse produced. Indeed, because a more or less horizontally aimed orientation of the laser ceilometer does not correspond to its operative position, it is presently preferred that the lowered effective emitted radiant power level $P_2$ be just slightly higher than the minimum or threshold value at which the laser-diode array 7 will reliably emit laser radiation at all, in which case the emitted radiant power will be, of course, very small.

The detector 2 comprises a receiver optics 12, again of cassegrainian-telescope configuration, a detector 13 comprised of a silicon avalanche diode as its radiation-responsive element, and an amplifier 14 operative for amplifying the signal received from detector 13 (and possibly also processing it in other respects) and transmitting the amplified signal to the control circuit 3. To facilitate adjustment of the operation and settings of the transmitter 1 and receiver 2, the instrument housing 4 is mounted tiltable as a whole in the direction of arrow 15 about a lower swing axis 16.

The operation of the various designs of ceilometer nowadays conventional being so familiar to persons skilled in the art, detailed explanation of such aspects of operation is unnecessary. Briefly stated, such ceilometers operate on the basis of the travel-time measurement of transmitted and then (diffusely) reflected pulses of radiant energy, in a manner analogous to radar. The emitted pulse of laser radiation is emitted vertically upwards, is diffusely reflected by an overhead cloud vertically downwards back to the ceilometer, is detected by the receiver 2 and the resultant signal is measured, processed, recorded and/or merely transmitted by the control circuit 3.

In the position of the ceilometer shown at the right in the FIGURE, switch 10 is closed and the laser-diode array 7 is energized with current pulses of amplitude so high that a very sizable operative distance range is established for the instrument, with the effective power level employed being just slightly below that associated with naked-eye eye damage, but being substantially above that associated with eye damage to observers viewing the beam directly through an 80-mm-diameter-objective telescope. Although the threat of eye damage to observers using telescopes is in theory very much present, due to the high effective power level employed, for reasons already explained the probability that the direct beam could be brought directly into the field of view of the eye of an observer utilizing a telescope from an overhead aircraft is immeasurably small, and indeed is to be considered simply non-existent.

During adjustment work and for certain other types of maintenance procedures, it is common to swing such a ceilometer in the direction of arrow 15 about its lower swing axis 16 from the vertically aimed orientation shown at the right in the FIGURE towards the horizontally aimed orientation shown at the left. As soon as the ceilometer has been tilted from vertically towards horizontally aimed orientation by more than 20°, and preferably by more than a mere 10°, the mercury switch 10 opens, and the amplitude of the current pulses furnished by current-pulse generator 6 is automatically lowered to a level just slightly above the laser-emission threshold level of the laser-diode array 7, so that the emitted effective power $P_2$ is instantly lowered to a small fraction of its normal or operative value $P_1$. Accordingly, if the ceilometer is swung over into horizontally aimed position, the effective level of emitted radiant power $P_2$ becomes so low that the direct beam can be directly viewed without the possibility of eye damage through the various types of optical devices which nearby observers might be using, e.g., the 80-mm-diameter-objective telescope forming the basis of eye-safety standards for emitted laser radiation.

In this way, applicable eye-safety standards can be met for all orientations of the ceilometer, especially the U.S. ASNI eye-safety standards (in Class 3). It is a particular advantage that, when testing or calibrating the ceilometer, e.g., testing the accuracy of the transmitting optics' setting and adjusting the operation of the transmitting circuitry, the requisite measurements (e.g., the ascertainment of the radiation diagram of the transmitter, etc.) can be performed at a specially lowered effective power level $P_2$, without danger. For such purposes the responsible technicians typically employ a diopter or a photoelectric photometer coupled to a telescope. In such cases, the lowered effective power level $P_2$ serves not only to prevent eye damage per se, but also to prevent damage to photometric instruments resulting from a technician's lack of familiarity with the careful handling procedures required when using such instruments.

It will be understood that, instead of mercury switch 10, other forms of motion-, position-, orientation- or gravity-responsive switches could be employed. Likewise, and as already stated, the effective emitted power of the laser ceilometer, as measured with regard to the threat of eye damage, can additionally or alternatively be automatically lowered by lowering the repetition frequency of the emitted pulses, and/or by lowering the duration of the individual emitted pulses, i.e., in addition to or instead of merely lowering the amplitudes of the emitted pulses. These latter techniques for automatically lowering the effective emitted power are applicable in those cases, for example, where the normal-operation amplitude, pulse duration and repetition frequency employed are such that the possibility of eye damage does not, to begin with, result from pulse amplitude per se and can occur only upon exposure to a series of emitted pulses in succession. Instead of utilizing electrical means to reduce the emitted laser beam power, and extremely simplified system can be utilized in which the position-sensitive mercury switch is replaced by an interposition of a gray, neutral density, optical absorptive grey glass filter into the beam.

If the laser of the laser ceilometer happens not to be of the type capable of direct electrical energization, such as a solid-state laser pumped by means of a flash lamp, then the mercury switch and parallel-connected resistor described above, or the equivalent, can be connected in the current path of the pumping flash lamp.

Finally, it is also possible not merely to reduce the effective emitted power level in automatic response to tilting towards the horizontally aimed direction, but instead to terminate operation of the laser source altogether. This alternative, although it has its advantage for laser ceilometers of various types, is particularly appropriate for laser ceilometers of very stable design such as do not require periodic testing or calibration or other adjustment work. Total shut-off is of especial significance when the ceilometer is being tilted towards horizontally aimed direction in the course of routine cleaning or when moving the ceilometer from one location to another location. This is because the personnel ordinarily entrusted with such work are frequently entirely ignorant of the potential for eye damage, especially the potential for eye damage to persons who, other than themselves, are also located within the operative range of the emitted beam. Furthermore, in such situations, if the laser employed is, e.g., a GaAs-GaAlAs laser-diode array or a neodymium laser, such personnel cannot even directly observe whether the ceilometer is in operation, because the wavelength of the emitted radiation is outside the range of visible light, e.g., is 0.9 or 1.06 microns, respectively. In such situations, the total-shut-off alternative may be preferable, and in general has a great deal to recommend it, especially inasmuch as such ceilometers are very often used at airports, where tourists and visitors may be present observing the airfield and its environs through binoculars.

In the illustrated embodiment, the housing 4 of the ceilometer is mounted for tilting movement in the direction of arrow 15 about a lower swing axis 16. However, it will be understood that the problems discussed above and arising when, for whatever reason, the laser ceilometer becomes more horizontally aimed can arise even when the instrument housing is not swingably mounted in the illustrated manner, e.g., when the instrument is, for whatever reason, tilted or knocked down onto its side as a whole.

It will be understood that each of the elements described above, or two or more together, may also find a useful application in other types of constructions and instrumentation differing from the types described above.

While the invention has been illustrated and described as embodied in a particular laser ceilometer mounted for tiltable motion about a horizontal swing axis, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An improvement in a laser ceilometer, for use in a laser ceilometer which can be vertically oriented, which can be tilted away from a vertical orientation, and which emits laser radiation, comprising a means responsive to orientation of the laser ceilometer and cooperating therewith in such a manner as to cause the laser ceilometer to emit a maximum effective radiant power of laser radiation when the laser ceilometer is vertically oriented, and to cause the laser ceilometer to emit a less-than-maximum effective radiant power when the laser ceilometer is tilted away from a vertical orientation.

2. The improvement defined by claim 1, said means including an inclinometric switch responsive to inclinations greater than 20°.

3. The improvement defined by claim 1, said means including an inclinometric switch responsive to inclinations greater than 10°.

4. The improvement defined by claim 1, wherein the less-than-maximum effective radiant power is eye safe.

5. The improvement defined by claim 1, wherein the means operates in a manner that the laser ceilometer continues to emit laser radiation at the maximum effective radiant power within a predetermined tilt angle away from a vertical orientation.

6. The improvement defined by claim 1, wherein the laser radiation is in the form of a pulsed beam having an amplitude, a pulse frequency, and a pulse duration, and wherein the means causes at least one of said amplitude, pulse frequency and pulse duration to be reduced when the laser ceilometer is tilted away from a vertical orientation.

7. The improvement defined by claim 1, wherein the means includes a gravity-responsive inclinometric switch.

8. The improvement defined by claim 6, wherein the laser ceilometer includes a current source and a laser connected to the current source and wherein the inclinometric switch is connected to the current source.

9. The improvement defined by claim 6, wherein the inclinometric switch is a mercury switch.

10. The improvement defined by claim 6, further including a resistor connected in parallel with the inclinometric switch.

11. The improvement defined by claim 6, wherein the inclinometric switch is connected in series with the laser.

12. The improvement defined by claim 1, wherein the laser radiation is emitted in a beam and wherein the means includes a filter which can be interposed in the beam.

13. The improvement defined by claim 12, wherein the filter is gray, has a neutral density, and is made of glass.

14. An improvement in a laser ceilometer, for use in a laser ceilometer which can be vertically oriented, which can be tilted away from a vertical orientation, and which emits laser radiation, comprising a means responsive to orientation of the laser ceilometer and cooperating therewith in such a manner as to cause the laser ceilometer to emit a maximum effective radiant power of laser radiation when the laser ceilometer is vertically oriented, and to prevent the laser ceilometer from emitting radiant power when the laser ceilometer is tilted away from a vertical orientation.

* * * * *